United States Patent
Jo et al.

(10) Patent No.: US 11,399,557 B2
(45) Date of Patent: Aug. 2, 2022

(54) LOW-CALORIE HOT SAUCE

(71) Applicant: SAMYANG CORPORATION, Seoul (KR)

(72) Inventors: A-ra Jo, Seongnam-si (KR); Bong Chan Kim, Seoul (KR); Si Young Kim, Hwaseong-si (KR); Kyung Soon Park, Seoul (KR); Su Youn Lim, Seoul (KR); Se Ra Hong, Namyangju-si (KR)

(73) Assignee: SAMYANG CORPORATION, Seoul (KR)

( * ) Notice: Subject to any disclaimer, the term of this patent is extended or adjusted under 35 U.S.C. 154(b) by 0 days.

(21) Appl. No.: 16/766,230

(22) PCT Filed: Oct. 29, 2018

(86) PCT No.: PCT/KR2018/012923
§ 371 (c)(1),
(2) Date: May 21, 2020

(87) PCT Pub. No.: WO2019/103337
PCT Pub. Date: May 31, 2019

(65) Prior Publication Data
US 2020/0367541 A1   Nov. 26, 2020

(30) Foreign Application Priority Data
Nov. 24, 2017   (KR) .......................... 10-2017-0158955

(51) Int. Cl.
*A23L 23/00*   (2016.01)
*A23L 29/269*   (2016.01)
(Continued)

(52) U.S. Cl.
CPC ............... *A23L 23/00* (2016.08); *A23L 27/10* (2016.08); *A23L 29/231* (2016.08); *A23L 29/238* (2016.08); *A23L 29/25* (2016.08); *A23L 29/256* (2016.08); *A23L 29/262* (2016.08); *A23L 29/273* (2016.08); *A23L 29/37* (2016.08); *A23L 33/26* (2016.08); *A23L 33/30* (2016.08)

(58) Field of Classification Search
CPC ........ A23L 23/00; A23L 29/273; A23L 33/30; A23L 29/262; A23L 33/26; A23L 29/231; A23L 29/256; A23L 27/10; A23L 29/37; A23L 29/238; A23L 29/25
USPC ......................................................... 426/589
See application file for complete search history.

(56) References Cited

U.S. PATENT DOCUMENTS

2007/0116834 A1   5/2007   Prakash et al.
2015/0320093 A1*  11/2015  Tokuda ..................... A23L 5/00
                                                          426/2

FOREIGN PATENT DOCUMENTS

CN    101700114 A  *  5/2010
JP    2017-121198       7/2017
(Continued)

OTHER PUBLICATIONS

Translation of CN-101700114-A (Year: 2010).*
(Continued)

*Primary Examiner* — Brent T O'Hern
(74) *Attorney, Agent, or Firm* — Lex IP Meister, PLLC (57) ABSTRACT

The present invention relates to low-calorie hot sauces, and more particularly, to hot sauces containing hot spices, acid-resistant thickeners and low-calorie or calorie-free saccharides.

11 Claims, 2 Drawing Sheets

(51) Int. Cl.
  *A23L 33/00* (2016.01)
  *A23L 29/262* (2016.01)
  *A23L 33/26* (2016.01)
  *A23L 29/231* (2016.01)
  *A23L 29/256* (2016.01)
  *A23L 27/10* (2016.01)
  *A23L 29/30* (2016.01)
  *A23L 29/238* (2016.01)
  *A23L 29/25* (2016.01)

(56) References Cited

FOREIGN PATENT DOCUMENTS

| KR | 10-2016-0089551 | 7/2016 |
| KR | 10-1766430 | 8/2017 |
| KR | 10-2017-0105441 | 9/2017 |
| KR | 10-2017-0105451 | 9/2017 |
| KR | 10-2017-0109343 | 9/2017 |
| KR | 10-2017-0118777 | 10/2017 |
| WO | 2015-075473 | 5/2015 |

OTHER PUBLICATIONS

KIPO, PCT Search Report & Written Opinion of PCT/KR2018/012923 dated Mar. 26, 2019.
EPO, European Search Report of EP 18880431.4 dated Apr. 15, 2021.

* cited by examiner

Sample 1

Sample 2

Sample 3

Sample 4

LOW-CALORIE HOT SAUCE

TECHNICAL FIELD

The present invention relates to low-calorie hot sauces, and more particularly, to hot sauces containing hot spices, acid-resistant thickeners and low-calorie or calorie-free saccharides.

RELATED ART

Sauce improves the taste of food and gives color to improve appetite and plays an important role in helping digestion. Sauce is a kind of seasonings that include mixture of various ingredients and are adjusted to be proper to food, and has been known as a liquid or semi-fluid seasoning that has been used to provide the taste and color of foods.

However, research on spicy sauce has not been widely conducted. The red pepper paste (Gochujang) of Korean traditional spicy sauce has limitations in applying only it to various kinds of foods, and has a problem in that it is not suitable for some foods in terms of its thick taste.

In general, when manufacturing a spicy seasoning, it is produced by mixing red pepper powder, chopped garlic, ginger, etc suitably with red pepper paste and aging for several days. In addition, the spiciness of the seasoning is adjusted by controlling the amount of red pepper powder. However, in order to remove the smells of ingredients, the process of adding garlic and soy bean paste (Doenjang) is required, and there is a tendency that the control of the spicy taste is not easy. Commercial sauces have a problem of excessive sugar intake and high calories by using excess sugar in raw materials to produce a sweet taste.

Sweeteners have long been widely used as additives in food, and natural saccharides such as sugar, fructose, glucose and the like are widely used in the beverage, food, drug, and oral hygiene/cosmetics industries due to their good taste. In particular, sugar is widely used because it imparts a desirable taste to the consumer.

Since sugar has excellent sweetness, it has been added to various foods and processed foods from old times, and has been regarded as the most preferred sweetener to enhance the taste and enhance the appetite of food. However, recently, the problem has been raised as the harmfulness of sugar continues to be revealed.

Recently, as one of the measures to solve adult diseases and obesity, which is a global problem, various policies are being implemented to reduce sugar intake in many countries including Korea. In the present specification, the term "saccharide intake reduction" means that unless otherwise specified, the content of monosaccharides and disaccharides such as glucose, fructose, and sugar which have been known to increase the risk of obesity, diabetes, cardiovascular disease, and various other adult diseases in case of excessive intake is reduced. In this regards, the term, "saccharide" does not rare sugars such as allulose, etc.

Allulose is one of functional saccharides known as a rare sugar and an epimer of D-fructose, and has a sweetness of about 60 to 70% of sugar, but almost zero calories, so as to have an effect of preventing and improving diabetes. In addition, allulose is also known to have excellent solubility, and is one of the materials that are paid attention to for food.

DETAILED DESCRIPTION

Technical Problem

An embodiment of the present invention relates to a hot sauce composition containing allulose and having a relatively low viscosity and low calorie being suitably used for a sauce, and an improved convenience and storage stability, and a method for manufacturing the same.

A further embodiment of the present invention relates to a blending sauce in which the hot sauces are blended and a method for manufacturing the blended sauce.

Another embodiment of the present invention relates to a food product comprising the hot sauce composition.

Technical Solution

The present inventors replace sugar with allulose and use hot spices and acid-resistant thickeners as ingredients, to prepare functional hot sauces with lower calories and reduce saccharides, and confirm the superiority of the sauces to which the acid-resistant thickener and alluose are applied, by testing the changes in physical properties of the final sauce product.

In addition, the present invention can prepare a low-calorie hot sauces having advantageous of allulose such as the inhibition of body fat and the like, by applying at least 75% by weight of an allulose, for example, the liquid allulose containing an allulose 90% by weight or more, based on the total amount of the sauce composition.

The present invention is a hot sauce composition containing allulose and having low viscosity and surface-adhesion property, resulting in excellent manufacturing availability and use convenience, as well as excellent storage stability due to the low hardening degree during storage. In addition, it provides usability to conveniently manufacture low-viscosity applications.

An embodiment of the present invention relates to a spicy sauce composition comprising a hot spice, allulose, and an acid-resistant thickener, and having a pH in the range of 3.5 to 5.5. Preferably, the spicy sauce composition has a viscosity of 200 to 5,000 cp at 40° C., a low-calorie food with a caloric value of 100 kcal or less per mL of the composition, and a spiciness degree of Scoville index of 250 to 1,500,000.

Hereinafter, the present invention will be described in more detail.

An embodiment of the present invention relates to a hot sauce composition comprising a hot spice, allulose, and acid-resistant thickener and having a pH in the range of 3.5 to 5.5. The sauce composition may be powder or liquid, but is preferably liquid.

The sauce composition has a viscosity of 200 to 5,000 cp at 40° C., a low-calorie food with a caloric value of 100 cal or less per mL of the composition, and the degree of spiciness of the composition may be a Scoville index of 250 to 1,500,000.

The sauce composition of the present invention is a low-calorie product, because it can replace all or part of the high-calorie saccharides with allulose alone or in combination with other saccharides. The sauce composition may be 100 kcal or less, 50 kcal or less, 45 kcal or less, or 40 kcal or less per unit mL of composition. According to the 'Labeling Standards of Foods, Etc.' of Korean Ministry of Food and Drug Safety for highlighting the nutritional content of the labeling standards of foods, the term, 'low-calorie' labeling can be performed, when the calorie is less than 40 kcal per 100 g of food or less than 20 kcal per 100 mL of food.

The viscosity range suitable for the sauce composition according to the present invention can be appropriately adjusted in consideration of the use and type, components, and the like. The preferred viscosity of the sauce composition according to the present invention is 200 to 5,000 cp, 200 to 4,500 cp, 200 to 4,000 cp, 200 to 3,500 cp, 200 to 3,000 cp, 200 to 2,500 cp, 200 to 2,000 cp, 200 to 1,500 cp, 300 to 5,000 cp, 300 to 4,500 cp, 300 to 4,000 cp, 300 to 3,500 cp, 300 to 3,000 cp, 300 to 2,500 cp, 300 to 2,000 cp, 300 to 1,500 cp, 400 to 5,000 cp, 400 to 4,500 cp, 400 to 4,000 cp, 400 to 3,500 cp, 400 to 3,000 cp, 400 to 2,500 cp, 400 to 2,000 cp, or 400 to 1,500 cp at 40° C.

The present invention is a spicy sauce composition containing allulose which has a low viscosity and surface adhesion, and thus is excellent in manufacturing availability and the convenience, and which has a low hardening degree during storage thereby providing excellent storage stability. In addition, it provides usability to conveniently manufacture applied foods having low-viscosity.

Preferably, considering the ease of use of the sauce composition, it is preferable to provide a sauce composition having an appropriate viscosity range, and a thickener may be included therein.

The sauce composition according to the invention is acidic pH range, for example, in the range of pH 3.5 to 5.5, pH 4.0 to 5.5, pH 4.5 to 5.5, pH 3.5 to 5.0, pH 4.0 to 5.0, or pH 4.5 to 5.0. As an example of the case that the sauce composition according to the present invention has an acidic pH, the sauce composition including allulose as a saccharide and an acidic pH range of allulose may also provide the sauce composition with an acidic pH range. In order to maintain the viscosity of the composition at a constant level, it is preferable to use an acid-resistant thickener that is stable in the acidic pH range of the sauce, and more preferably, a thickener having an acid-resistance and a heat-resistance.

For example, when the allulose content is applied to 75% by weight or more based on the 100% by weight of the sauce composition, it may have an acidic pH range. In order to achieve and maintain the proper viscosity in the acidic pH range, the acid-resistant thickener is preferably included.

As a viscosity regulator applicable to the present invention, an acid-resistant thickener is referred to material being capable of maintaining thickening properties under acidic condition, specifically maintaining the viscosity of the sauce composition to be applied, by maintaining the thickening properties under the condition of pH 3.5 to 5.5. In addition, the heat-resistant thickener means that it has heat resistance capable of maintaining thickening properties in a temperature range of 60 to 100° C. The "maintaining the viscosity of the sauce composition" means a viscosity measured by adding a thickener to the sauce, it means maintaining a viscosity of at least 90% or more, or 95% or more at 90° C., 90° C. for 15 minutes which is the general condition of heating sauce, based on 100% of the viscosity at the time when the sauce reaches. Also, it means to achieve or maintain the viscosity of at least 90% or more, 95% or more, or 97% or more under the temperature and/or acidic pH conditions.

Specific examples of the acid-resistant thickeners are celluloses (e.g., methylcellulose, carboxymethylcellulose calcium), propylene glycol alginate, sodium polyacrylate, modified starch (e.g., acetylated di-starch phosphate, starch acetate, hydroxypropyl starch, acetylated di-starch adipate, hydroxypropyl distarch phosphate), gums (e.g., guar gum, locust bean gum, gum arabic, xanthan gum, gellan gum), and pectin, and the acid- and heat-resistant thickeners may include acetylated di-starch adipate, hydroxypropyl distarch phosphate and xanthan gum. The thickener may be used as a mixture of one or two or more kinds.

The thickener may be included in the sauce composition at an amount suitable for satisfying the viscosity range suitable for the sauce composition, for example, 0.01 to 5% by weight, 0.05 to 5% by weight, 0.1 to 5% by weight, 0.01-3 wt %, 0.05-3 wt %, 0.1-3 wt %, 0.5-5 wt %, 0.5-3 wt %, 0.5-2 wt %, 0.7-5 wt %, 0.7-3 wt %, 0.7 to 2% by weight, 1.0 to 5% by weight, 1.0 to 3% by weight, or 1.0 to 2% by weight may be include, based on 100% by weight of the total sauce composition.

The sauce composition according to the present invention represents a spicy taste, and for this purpose, includes a hot spice, and may further include a spicy compound. If the spiciness of the sauce composition of the present invention is represented by a Scoville index, it may be 250 to 1,500,000. To increase or control the intensity of the spicy, a spicy compound can be added, and for example, a sauce having a spiciness degree of Scoville index 2250 to 1,500,000 can be prepared.

Based on the standard spiciness regulation (2014) established and published by the inistry of Agriculture, Food and Rural Affairs relating to the spiciness degree of the food, the spiciness degree of the food are classified into four types of slight hot taste having Scoville index of 2,250 or less, the medium hot taste having Scoville index of 2,250 to 4,000, the very hot taste having the Scoville index of 4,500 to 15,000, and the extreme hot taste having Scoville index of 15,000 or more. Preferably, the sauce of the present invention may have slight hot to the extreme hot taste, or the medium hot to extreme hot taste.

The sauce composition of the present invention may include hot spices that provide a spicy taste, and for example, may be one or more selected from the group consisting of red peppers, garlic, black peppers, onions, horseradish, and mustard. The hot spices may be used in crushed powder form or liquid form.

In consideration of the degree of spiciness of the sauce, the hot spices may be included in the sauce at an appropriate amount, and may be adjusted to various contents depending on the spiciness of the used spices. As an example, when using red pepper powder as a hot spice, 0.1 to 30% by weight, 0.1 to 20% by weight, 0.1 to 15% by weight, 0.1 to 10% by weight, 0.1 to 5% by weight, or 0.1 to 3% by weight can be used.

The red pepper powder can be used by appropriately selecting a variety of particle diameters. For example, fine red pepper powder can be commonly referred to particles having an average particle diameter of 1 to 3 mm, and coarse red pepper powder can be referred to particles having an average particle diameter of more than 3 mm to 6 mm or less. In addition, various types of red pepper powder can be used, for example, domestic red pepper powder, such as Chengyang red pepper powder, Chinese red pepper powder, and Vietnamese red pepper powder, but are not limited thereto.

The sauce composition of the present invention may include a spicy compound that provides a spicy taste, for example capsaicin. It may further include at least one spicy compound selected from the group consisting of piperine, chavicine, alicin, and signigrine. The spicy compound may be added at a suitable content in consideration of the degree of spiciness of the sauce composition, for example, the Scoville index.

The sauce composition of the present invention may include allulose as a saccharide, and may include an additional sweetener, which may include sugars, sugar syrups, oligosaccharides, glucose, fructose, corn syrup, and processed saccharides thereof, artificial sweeteners (e.g., sucralose, sugar alcohols, etc.), and high intensity sweeteners. These additional saccharides may be used by single saccharide or mixture of two or more. The high intensity sweeteners include, but are not limited to, acesulfame-K, alitam, aspartame, cyclamate, glycyrrhizin, NHDC, saccharin, stevioside, sucralose, taumatin, neotam and rebaudioside A, and the like. The specific example of the additional sweeteners may be one or more sweeteners selected from the group consisting of glucose, sugar, fructose, oligosaccharide, corn syrup, sucralose, sugar alcohol, and high intensity sweeteners.

In addition, the composition can be easily used, because it has low adhesion to a surface, etc. and does not adhere to cooking utensils as residues. In the conventional spicy sauce, the surface of spicy sauce that comes into contact with air is hardened, when it is stored at room temperature or under refrigeration, but the composition of the present invention includes allulose as a saccharide, thereby minimizing the problem of surface hardening.

The content of allulose may be an amount suitable for the degree of sweetness and sensory properties of the sauce composition, and the solid content of allulose can be 30 to 65% by weight, 35 to 65% by weight, 40 to 65% by weight, 45 to 65% by weight, 30 to 60% by weight, 35 to 60%, 40 to 60% by weight, 30 to 60% by weight, 35 to 60% by weight, 40 to 60% by weight, 45 to 66% by weight, 30 to 55% by weight, 35 to 55% by weight, 40 to 55% by weight, or 45 to 55% by weight, based on 100% by weight of the sauce composition. In addition, when using 70 brix of allulose solution, the content of liquid allulose based on 100% by weight of the sauce composition is 70 to 90% by weight, 75 to 90% by weight, 77 to 90% by weight, 70 to 87% by weight, 75 to 87% by weight, 77 to 87% by weight, 70 to 85% by weight, 75 to 85% by weight, or 77 to 85% by weight, based on 100% by weight of the sauce composition The allulose may be prepared by performing chemical synthesis or a biological method using an allulose epimerization enzyme, and preferably may be prepared by a biological method, such as a microorganism or an enzymatic reaction. For example, the allulose can be a mixed saccharide or obtained therefrom, and the mixed saccharide can be mixed saccharide or product obtained therefrom, by reacting a fructose-containing raw material with a composition for producing allulose comprising at least one selected from the group consisting of an allulose epimerase, a microbial cell of a microorganism producing the enzyme, a culture of the microorganism, a lysate of the microorganism, and an extract of the culture or the lysate.

The allulose included in the sauce composition of the present invention may be in the form of syrup or powder. The allulose syrup may be a solution prepared by using allulose at various concentrationse. For example, the solid content of allulose in the allulose syrup may include 10 to 100% by weight, preferably 70 to 99.99% by weight, or more preferably 90 to 99.99% by weight based on 100% by weight of allulose syrup. When the allulose powder is used, the solid content of allulose powder comprises allulose having a purity of 90 wt % or more, for example, 90 to 99.99% by weight, or more preferably 95 to 99.99% by weight based on the total content of the composition powder.

The allulose syrup may be obtained by separating, purifying and concentrating processes from the allulose alone or mixed saccharides. In an embodiment of the present invention, the allulose syrup that has undergone the separation and purification processes can have an electrical conductivity of 1 to 50 μS/cm, and a colorless or light yellow sweetness. When the liquid allulose may have pH 4 to 6, it is added to the sauce composition, so as to produce the sauce having acidic condition. The allulose may be allulose alone or contained in mixed saccharide including additional other saccharides. An example of the mixed saccharides may contain 1 to 99.9% by weight of allulose based on 100% by weight of the solid content of the total mixed saccharides, and additionally at least one selected from the group consisting of fructose and glucose. When the allulose-containing mixed saccharides include fructose and/or glucose, the mixed saccharides may include 1 to 90% by weight of fructose and/or 1 to 50% by weight of glucose.

The specific examples of the allulose-containing mixed saccharides, based on 100 parts by weight of the total solid content of the mixed saccharides, includes 5 to 95 parts by weight of allulose, 1 to 50 parts by weight of fructose, 1 to 55 parts by weight of glucose, and 1 to 10 parts by weight of oligosaccharides. It may not include oligosaccharides. All allulose, fructose and glucose are preferably D-isomers.

The composition of the present invention has a low viscosity compared to the sauces which sugar, fructose and the like are applied to, and thus, has good followability. Accordingly, the composition of the present invention is easy to handle not only in cooking or use as a cooking material, but also in the manufacturing process. For example, the spicy sauce composition of the present invention may have of 50 to 280 cp, preferably 100 to 250 cp, or more preferably 130 to 200 cp. of a viscosity as measured at a temperature of 30° C.

The spicy sauce composition of the present invention may further include one or more saccharides selected from the group consisting of monosaccharides, disaccharides, sugar alcohols, dietary fibers, and oligosaccharides other than allulose. Alternatively, the composition may further include at least one selected from starch decomposition products, for example, dextrin, maltodextrin, and isomaltodextrin.

For example, it may further include one or more saccharides selected from the group consisting of sugar, glucose, fructose (or crystalline fructose), tagatose, xylose, grain syrup, honey, corn syrup, isomaltoligosaccharide, and fructooligosaccharide.

In one embodiment of the present invention, the sauce composition may further include one or more sweetening materials selected from the group consisting of sucralose, rebaudioside, and stevia for sweetness control. The content of the added sweetening material may be an appropriate amount in consideration of the sweetness of each material compared to sugar, and for example, may be included in an amount of 0.00001 to 5% by weight based on 100% by weight of the sauce composition.

The hot sauce composition of the present invention includes edible oils (e.g., vegetable oils, animal oils, processed product the edible oils), dairy products (e.g., milks, processed oils, goat milk, fermented milk, butter, concentrated milk, milk creams, cheese, powdered milk, whey, lactose, milk protein hydrolysate), soy sauce (e.g. soy sauce, soy bean paste, red pepper paste, black soy bean paste (chunjang)), seasoned food (e.g. vinegar, sauces, tomato ketchup, curry, processed spices, complex seasoned), processed cocoa products or chocolates (e.g., cocoa mass, cocoa butter, cocoa powder and other processed cocoa products processed obtained by adding food or food additives, chocolate, milk chocolate, white chocolate, semi-chocolate, processed chocolate), pickled foods, agricultural processed foods (e.g. processed starch, wheat flour, peanut or nut processed foods, cereals, steamed rice, enzyme treated foods), egg processed foods (e.g. whole egg liquid, egg yolk liquid, egg white liquid, whole egg powder, egg yolk powder, egg white powder), edible colorants and flavoring agents, and these additives may be used alone or in combination of two or more thereof.

In one specific example, the additives used in the sauce composition according to the present invention may be one or more selected from the group consisting of dextrin, processed dairy products (e.g. processed butter and/or milk cream), salt, flavoring agents (e.g. milk flavor), garlic and parsley flakes as additional spices.

The salt is not limited to its kind, and may be one or more salts selected from the group consisting of sea salt, formulated salt, refined salt, pine salt, boiled salt, molten salt, processed salt, and bamboo salt may be used. Table salt may be added in the preparation of the base of traditional sauces or the hot pepper sauce composition. In the present invention, the salt may be included in an amount of 0.01 to 3% by weight based on 100% by weight of the total amount of the composition. Meanwhile, fish sauce and salt are added to control salinity with rich flavor. It is preferable to use the sea salt as the salt.

The spicy sauce according to the present invention may be used as a single sauce by itself, or may be blended as a raw material in the production of other sauces. When the spicy sauce composition is used as a single sauce, the meat patties may be prepared by mixing the appropriate amount of the sauce composition to crushed meats such as beef or pork. Alternatively, for example, the spicy sauce of the present invention as a raw material can be used for preparing other blended sauces, for example, Bulgogi sauce, grilled fish sauce, tteokbokki sauce, spicy potato curry sauce, salad sauce, spicy fruit dressing, pork cutlet sauce, chicken sauce, seasoned noodle sauce, spaghetti sauce, chinese fried food sauce, spicy jajangmyeon sauce (noodle with black soybean sauce), gambas sauce, and the like. It can be preferably used as a sauce material that provides a spicy taste, but is not particularly limited thereto.

Effect of the Invention

The spicy sauce according to the present invention may be used as a single sauce by itself, or may be blended as a raw material in the production of other sauces.

DETAILED DESCRIPTION OF THE EMBODIMENTS

The present invention will be described with reference to the following examples and test examples, but the scope of the present invention is not intended to be limited to the following examples.

EXAMPLES 1 TO 5

Preparation of Spicy Sauce

Among the ingredients listed in Table 1 below, the liquid raw materials were weighed and mixed, and the powdered raw materials were also weighed and mixed. The mixed powdered raw materials were added to the liquid raw material and stirred while heating at 95° C. for 10 minutes to prepare a spicy sauce. The prepared sauce was cooled and filled into a container.

The solid content (brix) of the liquid allulose was 70 brix, and the allulose content (% D.S) was 90% by weight. The allulose syrup had a pH of 4.5 and an electrical conductivity (μS/cm) of 20 μS/cm.

TABLE 1

| Raw material (weight, g) | Example 1 | Example 2 | Example 3 | Example 4 | Example 5 |
|---|---|---|---|---|---|
| Liquid allulose | 75.00 | 80.00 | 85.00 | 90.00 | 95.00 |
| Modified starch (Sun-Tender H ™) | 1.50 | 1.50 | 1.50 | 1.50 | 1.50 |
| Red pepper powder (32 mesh) | 0.50 | 0.50 | 0.50 | 0.50 | 0.50 |
| Oleoresin Capsicum 1,500,000 SHU | 0.10 | 0.10 | 0.10 | 0.10 | 0.10 |
| Dextrin (Genedex ™) | 1.00 | 1.00 | 1.00 | 1.00 | 1.00 |
| Processed butter | 1.00 | 1.00 | 1.00 | 1.00 | 1.00 |
| Purified water | 13.02 | 13.02 | 13.02 | 13.02 | 13.02 |
| Minced galic | 1.40 | 1.40 | 1.40 | 1.40 | 1.40 |
| Parsley flake 2 mm | 0.08 | 0.08 | 0.08 | 0.08 | 0.08 |
| Refined Salt | 0.20 | 0.20 | 0.20 | 0.20 | 0.20 |
| Milk flavor | 0.70 | 0.70 | 0.70 | 0.70 | 0.70 |
| Milk cream powder | 0.50 | 0.50 | 0.50 | 0.50 | 0.50 |
| Sum(weight, g) | 95.00 | 100.00 | 105.00 | 110.00 | 115.00 |

The Scoville index conversion table according to the capsicum content used in Table 1 is shown in the following table.

TABLE 2

| Sample sauce | Example #1 | Example #2 | Example #3 | Example #4 | Example #5 |
|---|---|---|---|---|---|
| Scoville index | 157,895 | 150,000 | 142,857 | 136,364 | 30,435 |

COMPARATIVE EXAMPLES 1 TO 3

In the same manner as in Example 1, a spicy sauce to which sugar was applied as a sweet ingredient was prepared, except that, 75 g of sugar in Comparative Example 1, 80 g of sugar in Comparative Example 2, and 85 g of sugar in Comparative Example 3 were used, respectively, instead of allulose used in Example 1

TABLE 3

| Raw material (weight, g) | Comparative Example 1 | Comparative Example 2 | Comparative Example 3 |
|---|---|---|---|
| White sugar | 75.00 | 80.00 | 85.00 |
| Modified starch (Sun-Tender H ™) | 1.50 | 1.50 | 1.50 |
| Red pepper powder (32 mesh) | 0.50 | 0.50 | 0.50 |
| Oleoresin Capsicum 1,500,000 SHU | 0.10 | 0.10 | 0.10 |
| Dextrin (Genedex ™) | 1.00 | 1.00 | 1.00 |
| Processed butter (Qone ™) | 1.00 | 1.00 | 1.00 |
| Purified water | 13.02 | 13.02 | 13.02 |
| Minced galic | 1.40 | 1.40 | 1.40 |
| Parsley flake 2 mm | 0.08 | 0.08 | 0.08 |
| Refined Salt | 0.20 | 0.20 | 0.20 |
| Milk flavor | 0.70 | 0.70 | 0.70 |
| Milk cream powder | 0.50 | 0.50 | 0.50 |
| Sum(weight, g) | 95.00 | 100.00 | 105.00 |

TEST EXAMPLE 1

Water Activity Evaluation

The water activity was measured using a water activity meter of Aqualab Series 3TE manufactured by Decagon Device. Inc (U.S.A.). The water activity was calculated according to the following equation, and a value can be easily obtained by using the water activity meter.

$$Aw = P/P1$$

where $Aw$ = water activity,
$P$ = water vapor pressure of the food at certain temperature
$P1$ = vapor pressure of pure water at certain temperature The water activity was measured for the sauces prepared in Examples 1 to 5 and Comparative Examples 1 to 2, and the measurement results are shown in the following table.

TABLE 4

| Sample name | Main saccharide | Water activity (Aw) |
|---|---|---|
| Comparative Example 1 | (Sugar 75) | 0.652 |
| Comparative Example 2 | (Sugar 80) | 0.711 |
| Example 1 | (Allulose 75) | 0.789 |
| Example 2 | (Allulose 80) | 0.766 |
| Example 3 | (Allulose 85) | 0.750 |
| Example 4 | (Allulose 90) | 0.710 |
| Example 5 | (Allulose 95) | 0.692 |

The water activity is an inherent property of food, and equilibrium relative humidity is a property under the environment in equilibrium with food. The water activity is a very important property in food because it is related to chemical, biophysical and physical reactions in food that change flavor, color, taste, and the growth of microorganisms.

As shown in the measurement results of water activity in Table 4, as the content of allulose contained in the sauces increased, it showed a tendency to decrease. Particularly, it showed the water activity being equivalent to or lower than the water activity of Comparative Example 2 using sugar, when the amount of allulose was 85 parts by weight or more (Examples 3 to 5). Because the sample in Comparative Example 3 was solidified after cooling, so the sauce could not be prepared. Particularly, as in Examples 3 to 5, since the water activity (Aw) of samples decreased to 0.75 or less, they could provide the environment inhibiting the microorganisms growing during use after opening the sauce, in consideration of most bacteria (Aw=0.93 standard), mold (Aw=0.8 standard), and halobacteria (Aw=0.75 standard).

TEST EXAMPLE 2

Viscosity and pH Analysis

For the sauces prepared in Examples 1 to 5 and Comparative Examples 1 to 2, viscosity and pH were measured according to the following measurement and analysis methods, and the analysis results are shown in Table 5 below. The viscosity of the hot sauce as a sample was measured at 160 rpm and 40° C. using a Rapid visco analyzer (Newport), and pH was measured using a pH meter, and the results are shown in Table 5 below.

TABLE 5

| Classification | Saccharide composition | Viscosity (cp) | pH |
|---|---|---|---|
| Comparative Example 1 | (sugar 75) | 6589 | 5.8 |
| Comparative Example 2 | (sugar 80) | 5868 | 5.75 |
| Example 1 | (allulose 75) | 589 | 4.49 |
| Example 2 | (allulose 80) | 524 | 4.40 |
| Example 3 | (allulose 85) | 526 | 4.42 |
| Example 4 | (allulose 90) | 573 | 4.56 |
| Example 5 | (allulose 95) | 673 | 4.30 |

As shown in the viscosity measurement results in Table 5, in Examples 3 to 5 applied with 85 parts by weight or more of allulose, it was possible to obtain 200 cp to 5000 cp, or preferably 500 to 1500 cp, which is a suitable viscosity for use as a sauce. On the other hand, in Comparative Example 3 in which sugar of the same weight as Example 3 was applied, the samples were solidified due to the high viscosity, so that it was impossible to use and measure the viscosity (no data in Table 5). In addition, the hot sauces according to Comparative Example 1 and Comparative Example 2 using sugar, they were confirmed that it was impossible to obtain a viscosity (200 cp to 5000 cp) suitable for use as a sauce due to the high viscosity.

According to the pH value of the hot sauces, it was confirmed that the hot sauces containing 75% by weight of allulose had slightly acidic pH. Thus, the sauce of the present invention obtain and maintains the proper viscosity of the sauce even at a slightly acidic pH.

TEST EXAMPLE 3

Sensory Evaluation of Spicy Sauce

In order to evaluate the sensory properties of satisfaction and texture satisfaction, when the sauces prepared in Examples 1 to 5 and Comparative Examples 1 to 2 were put in the mouth, evenly stimulated the oral epidermis for 20 seconds and spit out. Whenever the evaluation of one sample was completed the mouth was washed with water and the next sample was evaluated after 10 minutes. The sensory elements were displayed on a 5-point category scale. The sensory evaluation staff consisted of 15 panelists (20 to 40s, male and female) who were professionally trained in the evaluation of taste and flavor, and marked the sensory evaluation with 5-point category scale. The sensory evaluation criteria of the items are as follows, and the results are shown in Table 6 below.

<Sensory Evaluation Criteria>

Spreadability Soft (0 point)→hard (5 point)

Adhesion: Low (0 point)→High (5 point)

Texture Preference: Low (0 point)→High (5 point)

Overallliking: not very satisfied (0 points)→very satisfied (5 point)

TABLE 6

| Classification | Spreadability | Adhesion | Texture Preference | Overall-liking |
| --- | --- | --- | --- | --- |
| Comparative Example 1 | 4.2 | 4.3 | 2 | 2.3 |
| Comparative Example 2 | 4.2 | 4.1 | 2.1 | 2.2 |
| Example 1 | 2.2 | 3.1 | 3.1 | 3.3 |
| Example 2 | 1.7 | 2.4 | 2.6 | 2.8 |
| Example 3 | 2.2 | 3.1 | 3.3 | 3.5 |
| Example 4 | 2.1 | 3.1 | 3.4 | 3.6 |
| Example 5 | 2.2 | 3.2 | 3.2 | 3.4 |

As shown in the sensory evaluation results in Table 6, the hot sauces of Examples 3 to 5 which were applied with 85 parts by weight or more of allulose, showed the viscosity suitable for use as a sauce of 300 cp to 2000 cp, or preferably 500 to 1500 cp, resulting in low stiffness and excellent texture satisfaction. In particular, the sauces of Examples 3 and 4 had the highest overall satisfaction.

TEST EXAMPLE 4

Calorie Analysis of Spicy Sauce

The calorie value was measured by a theoretical calculation method using nutritional components and compared with the composition of Comparative Example. The results are shown in Table 7 below.

TABLE 7

| Sample | Calories (kcal) |
| --- | --- |
| Comparative Example 2 | 345 |
| Example 1 | 44 |
| Example 2 | 41 |
| Example 3 | 39 |
| Example 4 | 34 |
| Example 5 | 33 |

As shown in Table 7, when analyzing the calories of the prepared sauces, compared to 345 kcal of the calorie of Comparative Example 2 to which sugar was applied, the allulose-containing sauces according to Examples 1 to 5 with similar contents achieved a low calorie of less than 50 calories. Particularly, it was confirmed that the hot sauces prepared in Examples 3 to 5 satisfied the criteria of less than 40 calories per 100 g, which was a Korean regulation for low calorie food, and thus were suitable for low-calorie foods.

TEST EXAMPLE 5

Microbial Growth Analysis

Figure 1:
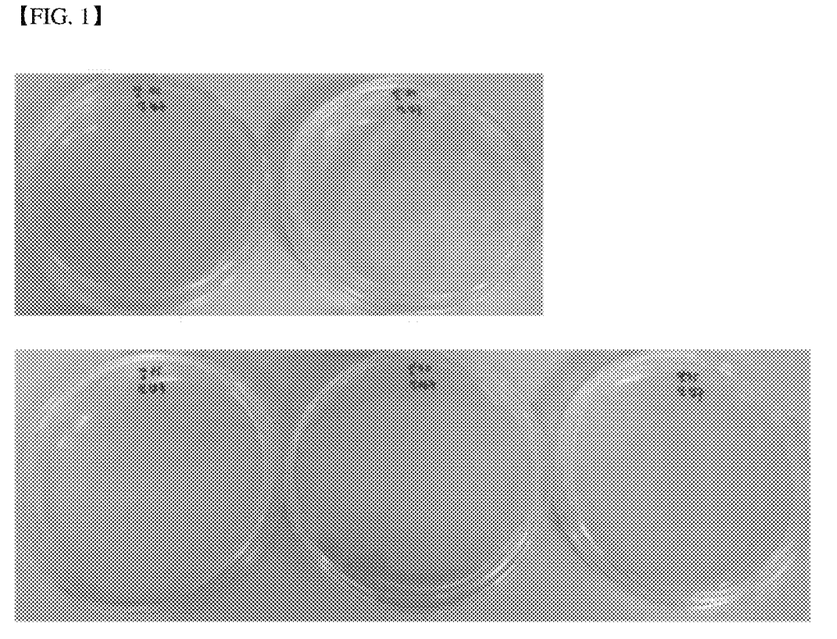
FIG. 1 is a photograph of the culture medium inoculated and cultured with microorganisms in Test Example 5.
Figure 2:
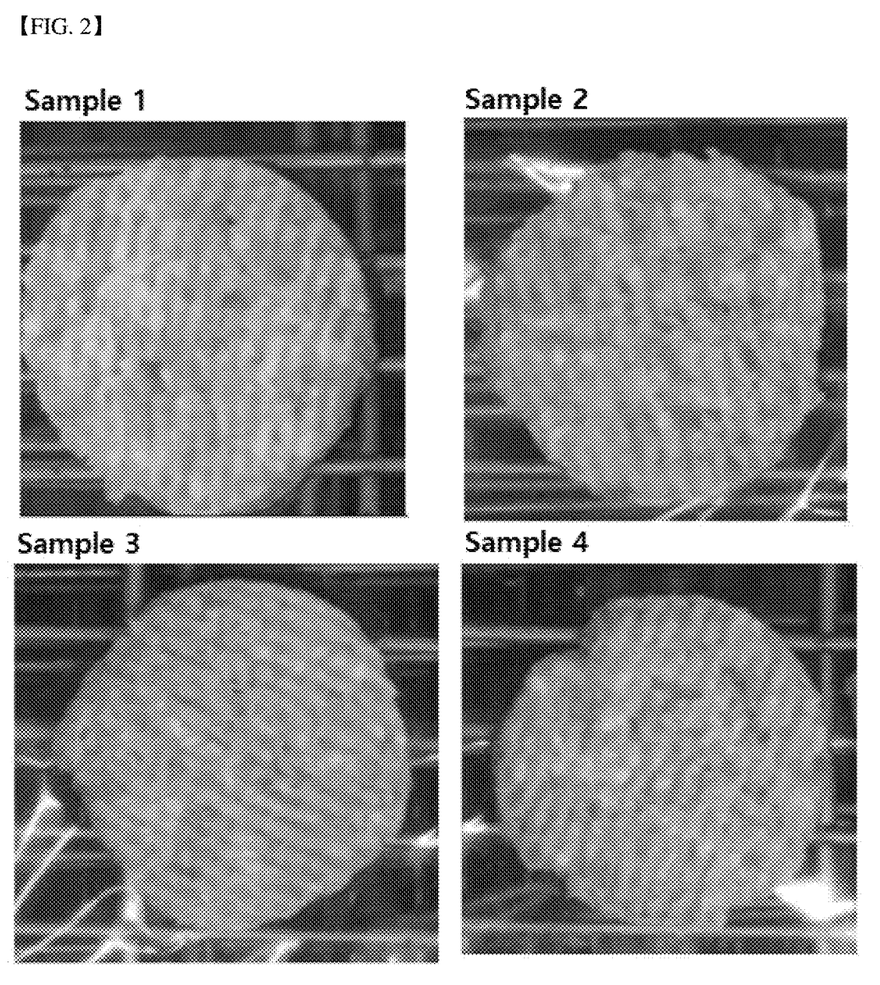
FIG. 2 shows a photograph of the meat patties prepared in Example 6.

The spicy sauces prepared in Examples 1 to 5 prepared by using allulose according to the present invention were left indoors for 30 minutes and diluted 100-fold, to prepare a test solution. After inoculating 1 ml of the diluted test solution into an empty petri dish, about 15 ml of PDA medium was dispensed and then mixed to solidify. After culturing the medium containing the test solution at 25° C. for 5 days, the results of microbial growth observation are shown in FIG. 1. As shown in FIG. 1, all spicy sauces of the Examples were confirmed to have the excellent storage stability for microorganisms, because the microbial colonies were not observed.

EXAMPLE 6

Preparation of Meat Patty Applied with Sauce 6-1: Preparation of Meat Patties

The pork hind leg meat was ground with an 8 mm grinder and added by the hot sauce prepared in Example 4 at the mixing ratio of Table 7 below. 100 g of the product was weighed, and molded in a 100 mm round patty. The patty was smoke-heated in the smoke house (berimex A. Berger e.K) 75° C. for 30 minutes, and refrigerated at 4° C. As shown in Table 8 below, four patty samples were prepared according to the sauce content of Example 4.

6-2: Measurement of the Yield of Meat Patties

For the molded patty samples, the weight was measured immediately after the patty manufacture. The weight of meat patty was measured after performing the smoke heat treatment, and divided by the weight of meat patty measured immediately after the patty manufacture, and calculated to obtain the yield (%) in a percentage in Table 8.

TABLE 8

| Samples | Meat weight (g) | Hot sauce of Example 4 (g) | Yield (%) |
| --- | --- | --- | --- |
| Sample 1 | 100 | 0 | 88.75 |
| Sample 2 | 100 | 5 | 89.70 |
| Sample 3 | 100 | 10 | 89.30 |
| Sample 4 | 100 | 15 | 89.60 |

As shown in Table 8 above, compared to the case of not using the sauce of Example 4, when using the sauce of Example 4 in the present invention, the meat content used per 100 g of patty was reduced with similar final yield, indicating that it was possible to prepare patties of equal weight by using less amount of meat.

6-3: Evaluation of Meat Patty Hardness and Chewiness

After cooling the meat patties of samples 1 to 4 prepared and stored in Example 6-1 at room temperature for 30 minutes, hardness and chewiness were measured with a texture analyzer (TA-XT2i, Stable micro system) and the results are shown in Table 9.

TABLE 9

| Samples | Hardness (g) | Chewiness |
| --- | --- | --- |
| Sample 1 | 11144.75 | 7351.50 |
| Sample 2 | 9628.25 | 3579.50 |
| Sample 3 | 8603.25 | 3250.25 |
| Sample 4 | 6670.13 | 2553.50 |

In the meat patties of Samples 1 to 4, as the hot sauce content increased, the hardness and chewiness decreased, which confirmed soft texture of the patties. As the content of allulose increased, it was confirmed that the texture of the meat patties became softer.

EXAMPLE 7

Preparation of Various Blending Sauces (1) Bulgogi Seasoning Sauce

Bulgogi seasoning sauce according to the present invention was prepared by adding 15% by weight of naturally brewed soy sauce to 50% by weight of the sauce of Example 4, and was blended with 100% by weight of raw beef. For comparison, it was prepared in the same manner, except that 50% by weight of the sugar-containing sauce obtained in Comparative Example 1 was used.

As a result of performing the sensory evaluation after cooking for 2 minutes on medium low heat after aging the meat containing the sauce for 2 hours, it was confirmed that the Bulgogi seasoning sauce according to the present invention had already removed bad taste and smell containing the blood taste of meat.

(2) Grilled Fish Sauce

It was prepared by adding 10% by weight of hot species (commercial chili or red pepper sauce such as Sriracha, Gochujang, Arrabbiata, Salsa, Chipotle, Sweet chili sauce, seasoning made from chili or red pepper), 20% by weight of naturally brewed soy sauce, and 10% by weight of tomato ketchup to 50% by weight of the sauce of Example 4. The blended sauce was applied to the surface of mackerel and cooked in an oven at 180° C. for 10 minutes.

(3) Tteokbokki Sauce

It was prepared by adding and mixing 15% by weight of hot sauce (commercial chili or red pepper sauce such as Sriracha, Gochujang, Arrabbiata, Salsa, Chipotle, Sweet chili sauce, seasoning made from chili or red pepper), 10% by weight of naturally brewed soy sauce, and 5% by weight of purified water to 70% by weight of the sauce of Example 4.

(4) Spicy Potato Curry Sauce

It was prepared by adding and mixing 20% by weight of frozen potato dice (thickness of 10 mm), 20% by weight of frozen onion chopping (thickness of 5 mm), 8% by weight of yellow curry paste, and 22% by weight of purified water to 30% by weight of the sauce of Example 4.

(5) Oil Sauce for Salad

It was prepared by adding and mixing 15% by weight of extra virgin olive oil, 10% by weight of white wine vinegar, and 10% by weight of purified water to 65% by weight of the sauce of Example 4.

(6) Spicy Fruit Dressing

It was prepared by adding and mixing 25% by weight of fruit puree, fruit concentrate, or fresh fruit, 15% by weight of white wine vinegar, and 10% by weight of purified water to 50% by weight of the sauce of Example 4.

(7) Spicy Sauce for Pork Cutlet

It was prepared by adding and mixing, 20% by weight of Worcester sauce, 15% by weight of tomato ketchup, frozen onion chopping (thickness 3 mm), 2% by weight of white roux and 8% by weight of purified water to 45% by weight of the sauce of Example 4.

The invention claimed is:

1. A sauce composition, comprising a hot spice, allulose and acid-resistant thickener and having a pH range of 3.5 to 5.5,
   wherein the allulose is comprised in a solid content of 51 to 65% by weight, based on 100% by weight of the sauce composition, and
   wherein the sauce composition has a water activity of 0.75 Aw or less, and a Scoville index of 250 to 1,500,000,
   wherein the hot spice is at least one selected from the group consisting of red peppers, black peppers, garlic, onions, horseradish and mustard.

2. The sauce composition according to claim 1, wherein the sauce composition has a viscosity of 200 to 5,000 cp at 40° C.

3. The sauce composition according to claim 1, wherein the sauce composition has a viscosity of 200 to 5,000 cp at 40° C. under condition of pH 3.5 to 5.5.

4. The sauce composition according to claim 3, wherein the acid-resistant thickener is at least one selected from the group consisting of methyl cellulose, carboxymethyl cellulose calcium, propylene glycol alginate, sodium polyacrylate, modified starch, gums and pectin.

5. The sauce composition according to claim 1, wherein the sauce composition further comprises at least one spicy compound selected from the group consisting of capsaicin, piperine, carbicin, allicin, and synigrin.

6. The sauce composition according to claim 1, wherein the calorie per unit mL of the composition is 100 kcal or less.

7. The sauce composition according to claim 1, wherein the sauce composition is prepared by adding allulose having a pH of 4 to 6.

8. The sauce composition according to claim 1, wherein the sauce composition further comprises at least one sweetener selected from the group consisting of glucose, sucrose, fructose, oligosaccharide, corn syrup, sucralose, sugar alcohol, and high-sensitivity sweetener, in addition to the allulose.

9. The sauce composition according to claim 1, wherein the allulose is added as an allulose-containing mixed saccharide syrup comprising allulose and one or more saccharides selected from the group consisting of fructose, glucose, and oligosaccharides.

10. The sauce composition according to claim 1, further comprising at least one additive selected from the group consisting of dextrin, butter, milk cream, salt, parsley flakes, flavoring agents, colorants, and garlic.

11. A food using the sauce composition according to claim 1.

* * * * *